R. E. CROSS.
FRICTION CHAIN HOIST.
APPLICATION FILED JUNE 18, 1908.

916,111.

Patented Mar. 23, 1909.
9 SHEETS—SHEET 1.

Fig. 1.

WITNESSES:
C. J. Reed.
C. L. Reed.

INVENTOR:
Randall E. Cross
by Seymour Earle
Attys

R. E. CROSS.
FRICTION CHAIN HOIST.
APPLICATION FILED JUNE 18, 1908.

916,111.

Patented Mar. 23, 1909.
9 SHEETS—SHEET 4.

Fig 4.

WITNESSES:

INVENTOR:

R. E. CROSS.
FRICTION CHAIN HOIST.
APPLICATION FILED JUNE 18, 1908.

916,111.

Patented Mar. 23, 1909.
9 SHEETS—SHEET 5.

Fig. 5.

WITNESSES:
C. J. Reed
C. L. Weed

INVENTOR:
Randall E. Cross
by Seymour & Earle
Attys

R. E. CROSS.
FRICTION CHAIN HOIST.
APPLICATION FILED JUNE 18, 1908.

916,111.

Patented Mar. 23, 1909
9 SHEETS—SHEET 6.

Fig 6.

WITNESSES:
C. J. Reed.
C. L. Weed.

INVENTOR:
Randall E. Cross
by Seymour & Earle
attys.

R. E. CROSS.
FRICTION CHAIN HOIST.
APPLICATION FILED JUNE 18, 1908.

916,111.

Patented Mar. 23, 1909.
9 SHEETS—SHEET 9.

WITNESSES
C. J. Reed.
C. L. Weed.

INVENTOR
Randall E. Cross
by Seymour & Earle
Attys.

UNITED STATES PATENT OFFICE.

RANDALL E. CROSS, OF WINSTED, CONNECTICUT, ASSIGNOR TO THE FRANKLIN MOORE CO., OF WINSTED, CONNECTICUT, A CORPORATION.

FRICTION CHAIN HOIST.

No. 916,111.          Specification of Letters Patent.          Patented March 23, 1909.

Application filed June 18, 1908. Serial No. 439,200.

*To all whom it may concern:*

Be it known that I, RANDALL E. CROSS, a citizen of the United States, residing at Winsted, in the county of Litchfield and State of Connecticut, have invented a new and useful Improvement in Friction Chain Hoists; and I do hereby declare the following, when taken in connection with the accompanying drawings and the characters of reference marked thereon, to be a full, clear, and exact description of the same, and which said drawings constitute part of this specification, and represent, in—

My invention relates to an improvement in friction chain hoists, the object being to produce a simple, compact, reliable and efficient device of relatively few parts and constructed with particular reference to virtually removing the weight of the load from the housing and throwing it directly upon the point of suspension.

With these ends in view my invention consists in a friction chain hoist having certain details of construction and combinations of parts as will be hereinafter described and pointed out in the claims.

In carrying out my invention as herein shown, I employ a top or suspension hook 2 the shank 3 of which is riveted in a horizontally arranged swivel-block 4 formed at its ends with trunnions 5 entering bearing holes 6 in the upper ends of two plate-like hangers 7 between the lower ends of which the load-sprocket 8 is located. The said load-sprocket 8, which may be of any suitable construction, is formed with a square opening 9 receiving the squared central portion 10 of the load-shaft 11 which is formed near its front end with a polygonal bearing 12 fitting a corresponding opening 13 in the load-gear 14 which is thus non-rotatably mounted upon the load-shaft 11 as well as the load-sprocket 8. As shown the load-sprocket 8 has five link-pockets 15 for the reception of the links of the load-chain 16 which is provided at one end with a load-hook 17, while its opposite end is attached by a stud 18 to a lug 19 cast upon the rear housing-member 20 which is cup-like in form and complementary to the front housing-member 21.

The load-shaft 11 is formed adjacent to its central squared portion 10 with circular bearings 22 and 23. Riding upon the front bearing 22 are a series of anti-friction rollers 24 located within a circular bearing-opening 25 in the lower end of the front hanger 7, the rollers 24 being formed with trunnions 26 journaled in washers 27 and 28. The washer 27 is located within the chambered inner face of the load-gear 14, while the washer 28 is located in a recess 29 in the front face of a load-sprocket 8. The said washers are secured together by three spacing-studs 30, the two washers and the three spacing-studs forming, as it were, a cage for the anti-friction rollers. Riding upon the rear bearing 23 are a series of corresponding anti-friction rollers 31 located within a circular bearing-opening 32 corresponding to the bearing-opening 25 and formed in the lower end of the rear hanger 7, the said rollers 31 being formed at their ends with trunnions 33 journaled in washers 34 and 35. The washer 34 is located in a recess 36 in the rear face of the load-sprocket 8 while the washer 35 is interposed between the rear face of the rear hanger 7 and a spacing-collar 37 interposed between the rear face of the rear hanger and the bottom of the rear housing-member 20, as clearly shown in Fig. 6.

The load-shaft 11 is formed at its extreme ends with bearings 38 which enter and turn in hubs 39 formed below the centers of the housing-members 20 and 21. However but little weight falls upon the said bearings 28 as the greater portion of it falls upon the bearings 22 and 23 which transmit it through the rollers 24 and 31 to the two hangers 7 suspended from the suspension hook 2.

Figure 5:
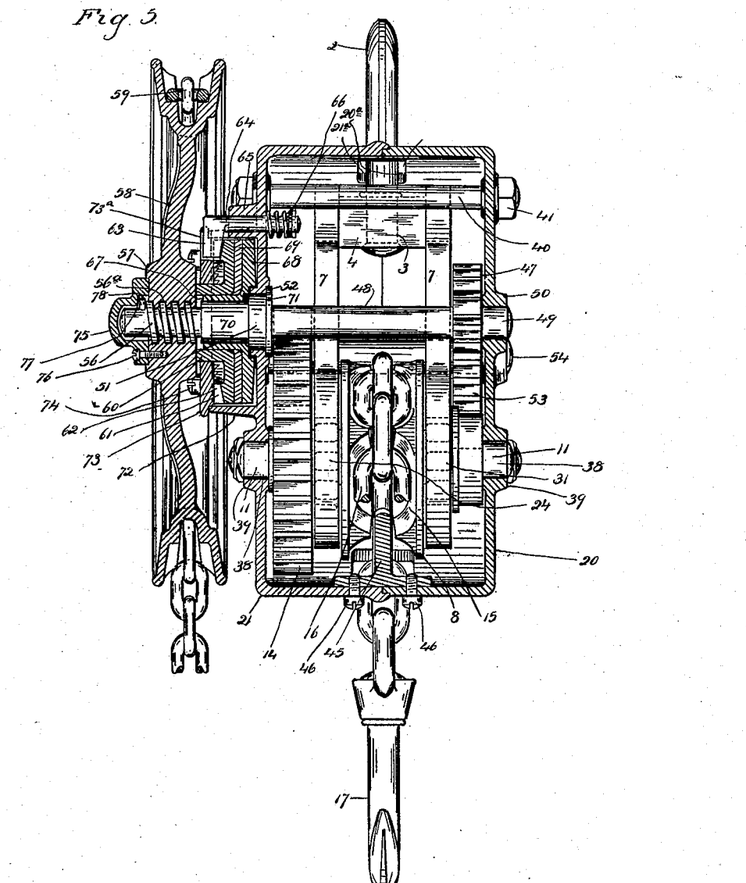
Fig. 5 a view of the hoist in vertical section on the line B—B of Figs. 1 and 2.
Figure 6:
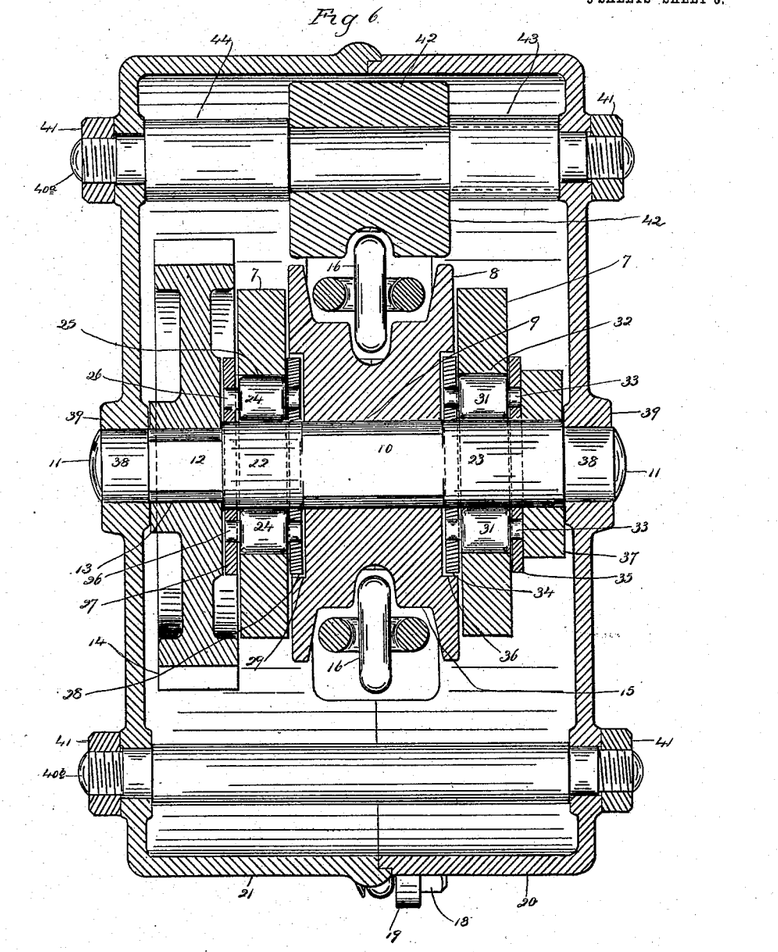
Fig. 6 a view of the hoist on an enlarged scale in horizontal section on the line A—A of Fig. 4 and looking downward.
Figure 7:
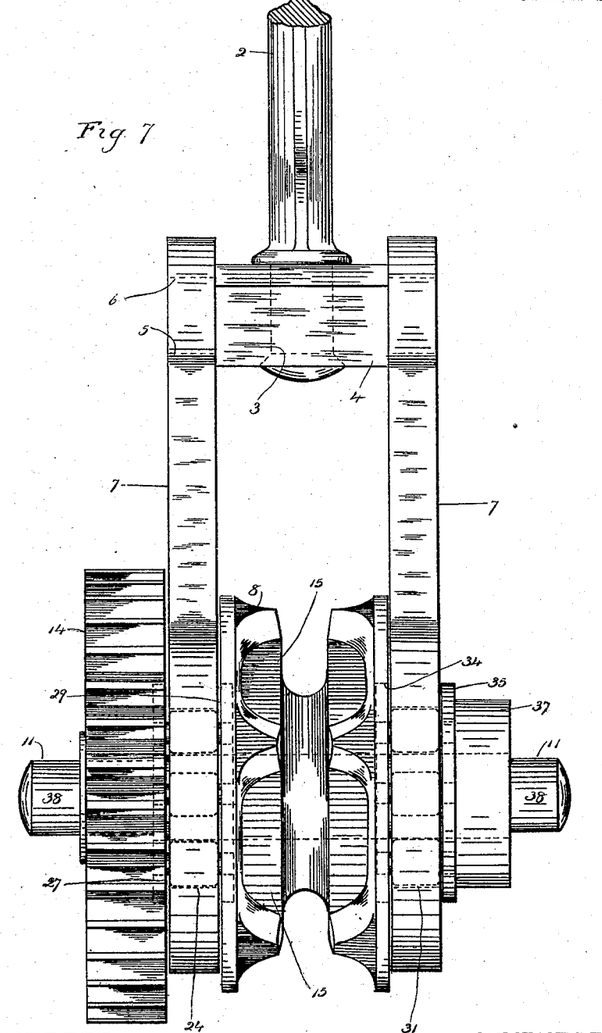
Fig. 7 a detail view on the scale of Fig. 6 and showing the hangers, the load-shaft, the load-sprocket and the load-gear in side elevation, the top or suspension hook being partly broken away.
Figure 8:
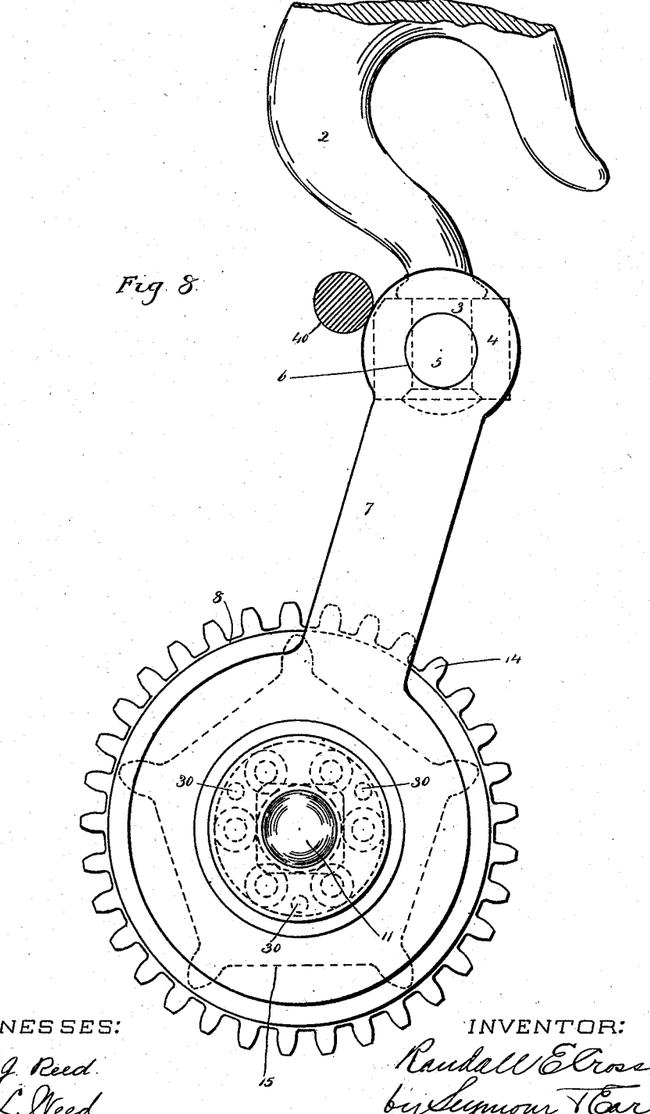
Fig. 8 a view of the same parts in rear elevation, the upper binding stud being shown in section.
Figure 9:
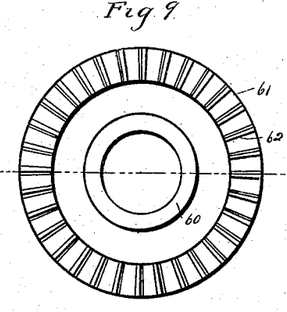
Fig. 9 a detached face view of the ratchet-wheel.
Figure 10:
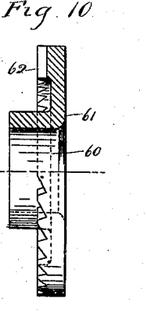
Fig. 10 an edge view thereof in side elevation of the hand-wheel cap.
Figure 11:
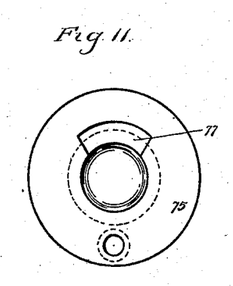
Fig. 11 a detached view of the coupling-cap secured to the hand-wheel.
Figure 12:
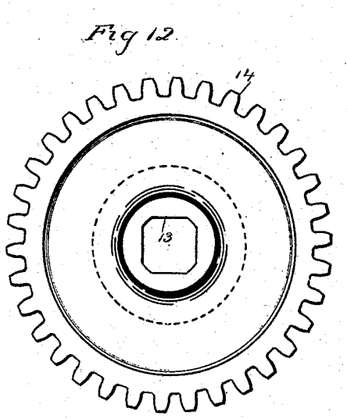
Fig. 12 a detached view of the load-gear.
Figure 13:
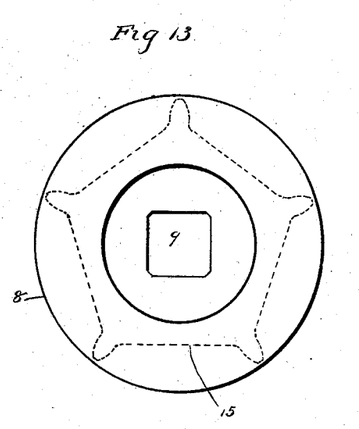
Fig. 13 a corresponding view of the load-sprocket.
Figure 14:
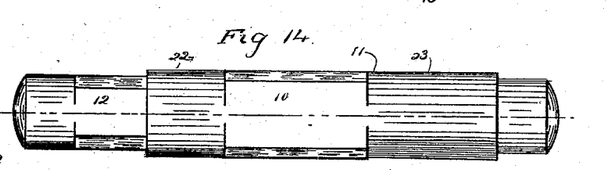
Fig. 14 a view of the load-shaft.
Figure 15:
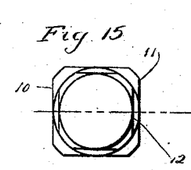
Fig. 15 an end view thereof showing the squared bearing for the load-gear.

The two cup-like housing-members 20 and 21 correspond to each other in diameter and are of nearly the same depth, the front member 21 being, as shown, slightly deeper than the rear member 20. The meeting edges of the two members are constructed to interlock and form a tight joint, and the two members are held together by three binding studs 40, 40ª and 40ᵇ, the projecting ends of which are furnished with nuts 41. Notches 20ª and 21ª formed in the edges of the said housing-members are provided for the clearance of the suspension-hook 2. The upper binding stud 40 is located directly back of the upper ends of the hangers 7 in position to be engaged thereby so as to maintain a line of draft through the load-chain 16 and load-hook 17. The front binding stud 40ª of the two lower binding studs, passes through and carries an irregular block 42 forming the load-chain guide and functioning to prevent the load-chain 16 from getting out of its proper relation to the load-sprocket 8 and therefore insuring the right presentation of the links of the said chain to the link-pockets 15 of the load-sprocket. The said guide 42 is kept in place upon the said stud 40 by means of two spacing thimbles 43, 44, as shown in Fig. 6. For the purpose of preventing the links of the chain from being fouled in the pockets 15 of the load-sprocket 8 on the reverse rotation thereof, I employ a load-chain stripper 45 secured by screws 46 as shown in Fig. 5, to the adjacent edges of the housing-members 20 and 21.

For driving the load-sprocket 5 I employ a driving-pinion 47 at the rear end of the hand-wheel shaft 48 which is located directly above the load-shaft 11. The said hand-wheel shaft is formed at its extreme rear end with a bearing 49 journaled in a hub 50 in the rear housing-member 20, and near its forward end with a flanged bearing 51 journaled in a bearing-hole 52 in the housing-member 21. The pinion 47 meshes into two intermediate gears 53 mounted upon shafts 54 journaled at their ends in the housing-members 20 and 21 and also carrying intermediate pinions 55 and 55ª meshing into the load-gear 14.

Figure 1:
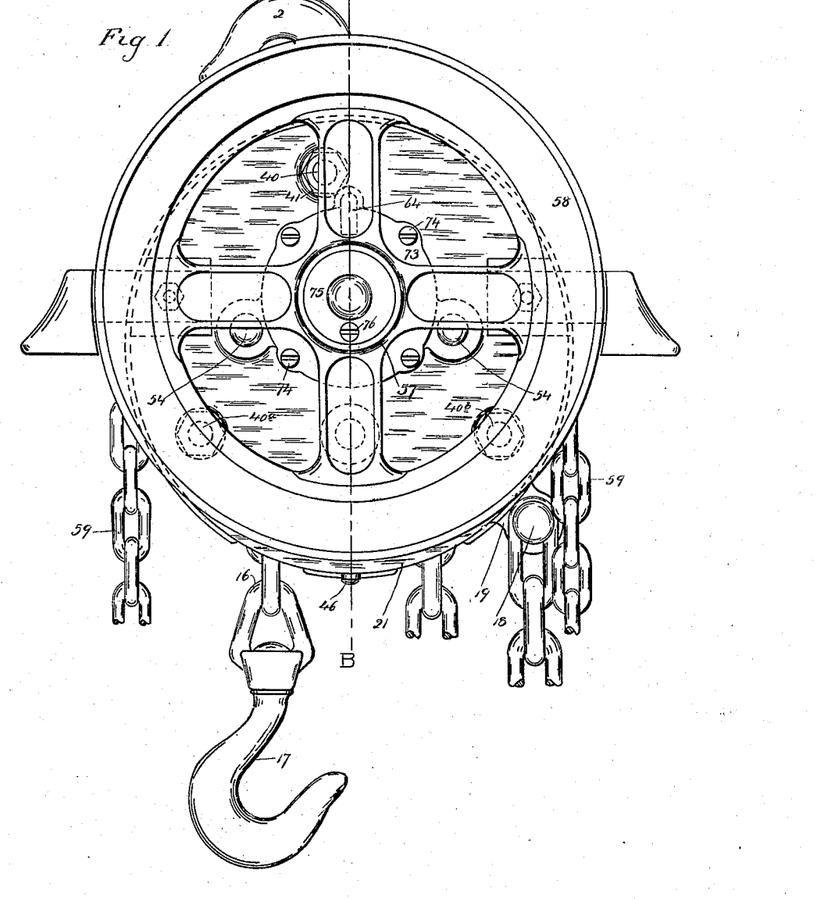
Figure 1 a view in front elevation of a friction chain hoist constructed in accordance with my invention.
Figure 2:
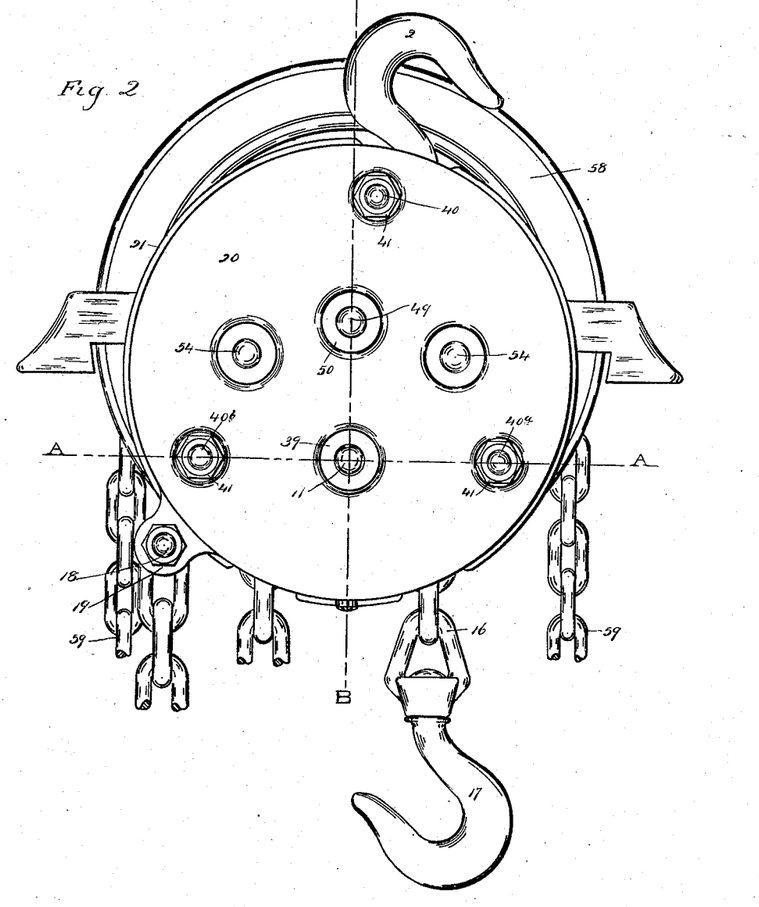
Fig. 2 a view thereof in rear elevation.
Figure 3:
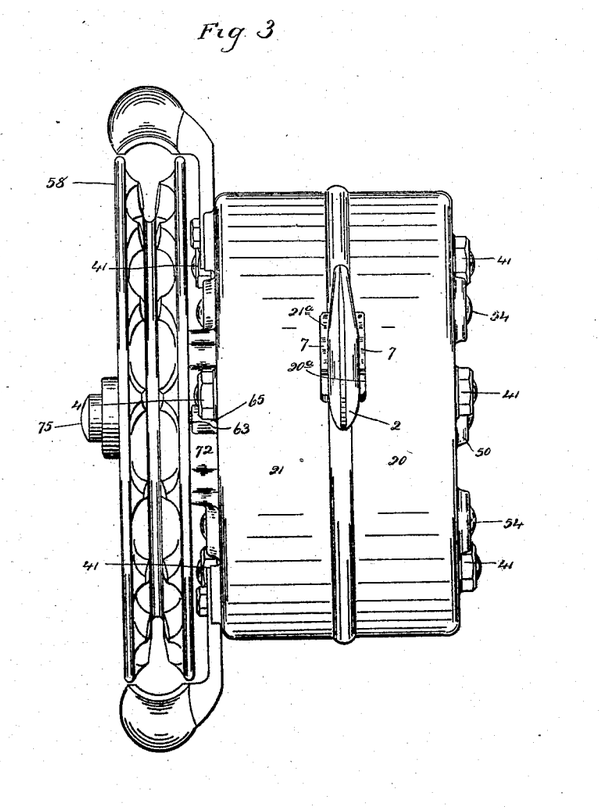
Fig. 3 a plan view thereof.
Figure 4:
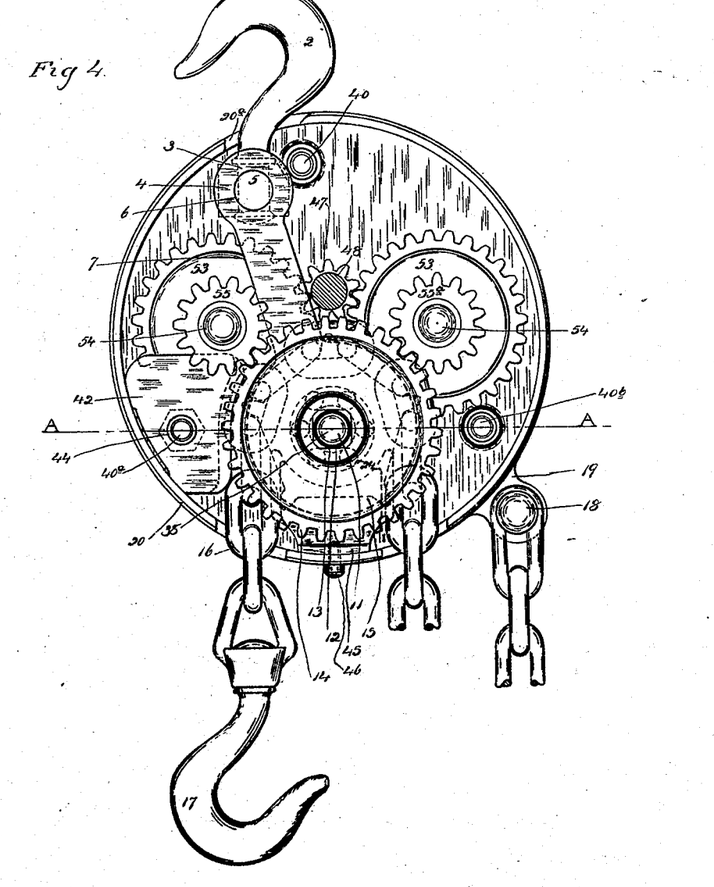
Fig. 4 a view of the hoist in elevation with the hand-wheel and its appurtenances and the front housing-member removed.

The forward end of the hand-wheel shaft 48 projects through the housing-member 21 and is furnished with worm threads 56 taking into corresponding threads 56ª formed within the hub 57 of the hand-chain wheel 58 the grooved periphery of which has pockets for the reception of the links of the hand-chain 59 which is manipulated by the person using the hoist. The said hand-wheel 58 is depended upon for producing and controlling the friction required for supporting the load as well as for the power for rotating the load-sprocket 8. Accordingly the inner face of its hub 57 is engaged with the forwardly projecting edge of the sleeve 60 of a ratchet-wheel 61 having face teeth 62 engaged by a pawl 63 located upon the forward end of a stem 64 mounted so as to reciprocate in a boss 65 cast integral with the housing-member 21, the inner end of the stem 64 being encircled by a spring 66 which exerts a constant effort to engage the pawl 63 with the face-teeth 62 of the ratchet-wheel 61. The pawl 63 on account of its inward pressure upon the beveled, radiating face-teeth 62 of the ratchet-wheel 61, exerts a constant effort to move the said wheel inward in addition to holding it against rotation. The sleeve 60 turns upon the forwardly projecting sleeve 67 of a friction-disk 68 which coacts with a friction washer 69 of leather or suitable material interposed between it and the inner face of the ratchet-wheel 61. The sleeve 67 of the friction-disk 68 is mounted upon a bearing 70 formed upon the hand-wheel shaft 48 at a point directly in front of the flanged bearing 51 thereof, being fixed to the bearing 70 by a pin 71. The friction-disk 68, the friction-washer 69 and the ratchet-wheel 61 are all located within a circular flange 72 cast integral with the front face of the housing-member 21 and closed by a cap 73 secured in place by screws 74 as best shown in Fig. 1, the said cap having a slot 73ª for the reception of the pawl 63 which is thus held against rotation. The said flange 72, its cap 73 and the disk 68, washer 63 and wheel 61 form what is called, in the nomenclature of this art, the "friction box."

Upon the initial reverse movement of the hand-wheel 58 the friction is, so to speak, let off or reduced to permit the controlled or slow reverse rotation of the load-sprocket 8. For this purpose the hand-wheel 58 is provided with a coupling cap 75 secured in place by a screw 76, inclosing the projecting forward end of the hand-wheel shaft 48, and having a recess 77 for the reception of a coupling pin 78 mounted in the end of the shaft which is thus left free to be reversely rotated independently of the hand-wheel for a distance represented by the travel of the pin 78 in the recess 77. The hand-wheel 58 being started in reverse rotation by pulling upon the hand-chain 59, will therefore turn independently of the shaft 48 and be moved outward thereupon by means of the worm threads 56 and 56ª, whereby the inner face of the hub 57 of the wheel will be moved away from the edge of the sleeve 60 of the ratchet-wheel 61 the inward pressure of which against the friction-washer 69 will thus be considerably reduced. After the hand wheel 59 has been given this initial reverse movement, one wall of the recess 77 in the cap 75 will engage with the pin 78 whereby the said wheel and shaft will be coupled for reverse rotation together under the control of the "friction-box" and hand chain.

Having now described my improved friction hoist as to the details of its construction, I will briefly set forth the method of its operation. The load-hook 17 having been hooked onto the load, whatever that may be, the user of the device seizes the hand-chain 59 and begins the rotation of the hand-wheel 58 from left to right. The initial movement of the wheel 58 takes place with the hand-wheel shaft 48 at rest, the wheel being moved slightly inward by the worm-threads 56 and 57, whereby the inner face of its hub 57 is crowded against the edge of the sleeve 60 of the ratchet-wheel 61 so as to crowd the inner face thereof against the friction-washer 59 which in turn is crowded against the friction-disk 68 which is pinned to the hand-wheel shaft. The friction thus developed by the "friction box," is sufficient to couple the hand-wheel 58 and its shaft 48 so that they will thenceforth be rotated together from left to right by the hand chain 59. During this rotation of the hand-wheel from left to right the pawl 63 will ride, or, as the term is, "ratchet-back" over the face teeth 62 of the ratchet-wheel 61. This movement is continued until the load has been raised as desired. If at any time during the lifting of the load, the pull on the chain is relieved, the pawl will at once engage with a tooth of the ratchet-wheel and the load will be held by the "friction-box." To lower a load, the hand-chain 59 is manipulated to start the hand-wheel 58 turning from right to left. The initial right to left movement of the hand-wheel takes place with the hand-shaft 48 held at rest by the engagement of the pawl 63 with one of the teeth of the ratchet-wheel 61. This initial right to left movement of the hand-wheel 58 effects its slight outward movement on the hand-shaft, whereby the inward pressure of its hub 57 upon the sleeve of the ratchet-wheel 62 is reduced, and the friction of the "friction box" reduced before the pin 78 engages with one of the end walls of the recess 77 in the cap 75 as already described, but the pawl 63 still retains its hold upon the tooth of the ratchet wheel with which it was engaged. Thenceforth the rotation of the hand-wheel 58 by the chain 59 from right to left, takes place against the friction of the friction-disk 68 on the washer 69. The load therefore is lowered under this control.

I claim:—

1. In a friction chain hoist, the combination with a suspension hook, hangers having swivel connection therewith and depending therefrom, a load-shaft supported by the hangers, a load-sprocket and a load-gear carried by the said load-shaft, a case, a hand-wheel shaft carried thereby, and gearing connecting the hand-wheel shaft with the load-gear.

2. In a friction chain-hoist, the combination with a case, of a hand-wheel shaft carried thereby, a hand-wheel on the said shaft, a suspension hook, hangers depending therefrom, a load-shaft journaled in the hangers and located below the hand-wheel shaft, a load-sprocket and a load-gear carried by the load shaft, and gearing between the load-gear and the hand-wheel shaft.

3. In a friction chain-hoist, the combination with a two-part case composed of two deep cup-like members having their edges interlocked, a hand-wheel shaft journaled in the said case, a hand-wheel on the said shaft, a suspension-hook, two hangers located within the case and suspended from the suspension-hook, a load-shaft carried by the hangers, a load-sprocket and a load-gear carried by the load-shaft, and gears connecting the hand-wheel shaft with the load-gear.

4. In a friction chain-hoist, the combination with a case, of a hand-wheel shaft journaled therein, a hand-wheel carried by the said shaft, a suspension hook, hangers located within the case and connected at their upper ends with the said hook, a load-shaft passing through the hangers, anti-friction rollers interposed between the hangers and the load-shaft, a load-sprocket carried by the load-shaft, a load-gear, and gears between the load-gear and the hand-wheel shaft.

5. In a friction chain-hoist, the combination with a case, of a hand-wheel shaft journaled therein, a hand-wheel carried by the said shaft, a suspension hook, hangers depending therefrom, a load-shaft passing through the hangers, anti-friction rollers interposed between the hangers and the load-shaft, cages for the said rollers each cage comprising a pair of washers located upon the opposite faces of the respective hangers, a load-sprocket carried by the load-shaft, a load-gear, and gears between the load-gear and the hand-wheel shaft.

6. In a friction chain-hoist, the combination with a case, of a hand-wheel shaft journaled therein, a hand-wheel on the said shaft, a suspension-hook, hangers located within the case, swivel connection between the said hook and hangers, a load-gear carried by the load-shaft, and gears between the load-gear and the hand-wheel shaft.

7. In a friction chain-hoist, the combination with a two-part case, of a hand-wheel shaft journaled therein, a hand-wheel carried by the said shaft, a suspension hook, hangers located within the case and connected with the said hook, a load-shaft journaled in the said hangers, a load-sprocket and a load-gear carried by the load-shaft, gears between the load-gear and the hand-wheel shaft, a binding-stud passing through the case, and a load-chain guide mounted upon the said stud adjacent to the load sprocket.

8. In a friction chain-hoist, the combination with a two-part case, of a hand-wheel shaft journaled therein, a hand-wheel carried by the said shaft, a suspension-hook, hangers located within the case and connected with the said hook, a load-shaft carried by the hangers, a load-sprocket and a load-gear carried by the load-shaft, a load-chain passing over the load-sprocket, and a load-chain stripper secured to the two parts of the case in position to coact with the load-sprocket.

9. In a friction chain-hoist, the combination with the case thereof, of a hand-wheel shaft journaled therein and having a worm thread located directly upon it, a hand-wheel having a hub formed with a worm-thread taking into the worm-thread upon the shaft, and friction mechanism operated by inward pressure transmitted to it by the inner face of the hand-wheel as the same is moved laterally inward by the coaction of the said worm-threads, the said mechanism including a ratchet-wheel having an outwardly projecting sleeve engaged by the inner face of the hub of the hand-wheel and crowded inward thereby during the inward movement of the hand-wheel upon the shaft.

10. In a friction chain-hoist, the combination with the case thereof, of a hand-wheel shaft journaled therein and having a worm-thread formed directly upon it, a hand-wheel having a worm-thread taking into the worm-thread upon the shaft, a ratchet-wheel having an outwardly projecting sleeve engaged by the inner face of the hub of the said hand-wheel and crowded inward thereby during the inward movement of the hand-wheel upon the shaft, a pawl for the said ratchet-wheel, a friction-disk rotated with the shaft, and a friction-washer interposed between the said ratchet-wheel and friction-disk, whereby the ratchet-wheel is crowded inward by the hand-wheel and in turn crowds the friction-washer against the friction-disk.

11. In a friction chain hoist, the combination with the case thereof, of a hand-wheel shaft journaled therein, a hand-wheel mounted on the said shaft and having lateral movement thereon, and a friction mechanism applied by the inward movement of the said wheel on the said shaft, the said mechanism including a ratchet-wheel having beveled face-teeth, and a spring-actuated pawl coacting with the said face teeth and tending to force the said ratchet-wheel laterally inward.

12. In a friction chain hoist, the combination with the case thereof, of a hand-wheel shaft journaled therein, a hand-wheel mounted on the shaft with a capacity for lateral movement thereon, and a friction mechanism controlled by the lateral movement of the hand-wheel on the hand-wheel shaft and located within a circular flange formed upon the case and provided with a cap.

13. In a friction chain hoist, the combination with the case thereof, of a hand-wheel shaft journaled therein, a hand-wheel on the said shaft, means for moving the said wheel laterally on the said shaft, friction mechanism for controlling the rotation of the hand-wheel shaft and itself controlled by the lateral movement of the hand-wheel upon the said shaft, a cap applied over the projecting outer end of the shaft, secured to the outer face of the hub of the wheel and having an internal clearance recess, and a coupling pin carried by the said shaft and entering the said recess, whereby the wheel is permitted to be initially turned from right to left without disturbing the shaft, for a distance represented by the length of the said clearance recess.

14. In a friction chain hoist, the combination with the case thereof, of a hand wheel shaft journaled therein and projecting at one end therefrom, a worm thread located upon the projecting end of the shaft, a hand wheel having its hub formed with a corresponding worm thread, a ratchet-wheel having face teeth, an outwardly projecting sleeve coacting with the inner face of the hub of the hand wheel, a spring-actuated pawl for coaction with the face teeth of the ratchet wheel, a friction-disk rotating with the hand-wheel shaft, a friction-washer interposed between the friction-disk and the ratchet-wheel, and means applied to the hand-wheel for coacting with the projecting end of the shaft to permit the wheel to have a slight initial lateral movement upon the shaft preparatory to the rotation of the shaft with the wheel in either direction.

15. In a friction chain-hoist, the combination with a case, of a hand-wheel shaft journaled therein, a hand-wheel carried by the said shaft, a suspension hook, hangers located within the case and connected at their upper ends with the said suspension hook, a load-shaft carried by the hangers, a load-sprocket and a load-gear carried by the load-shaft, a driving pinion located upon the hand-wheel shaft, intermediate gears meshed into by the said driving-pinion, and intermediate-pinions turning with the said intermediate-gears and meshing into the load-gear whereby the load is removed from the case to the hangers.

In testimony whereof, I have signed this specification in the presence of two subscribing witnesses.

RANDALL E. CROSS.

Witnesses:
GRACE J. ELMORE,
NELLIE I. MURPHY.